United States Patent [19]
Yamashita et al.

[11] Patent Number: 5,785,032
[45] Date of Patent: Jul. 28, 1998

[54] FUEL SUPPLY SYSTEM

[75] Inventors: Keiichi Yamashita, Kariya; Kouji Izutani, Nagoya; Kingo Okada; Hideto Takahashi, both of Kariya, all of Japan

[73] Assignee: Nippondenso Co., Ltd., Kariya, Japan

[21] Appl. No.: 694,118

[22] Filed: Aug. 8, 1996

Related U.S. Application Data

[63] Continuation of PCT/JP95/02241, Nov. 2, 1995.

[30] Foreign Application Priority Data

Feb. 3, 1995 [JP] Japan .................................. 7-017308

[51] Int. Cl.$^6$ ............................................. F02M 37/04
[52] U.S. Cl. ............................................. 123/509; 123/510
[58] Field of Search ............................ 123/509, 510, 123/514, 497; 210/243, 446

[56] References Cited

U.S. PATENT DOCUMENTS

| | | |
|---|---|---|
| 5,076,920 | 12/1991 | Danowski et al. |
| 5,078,167 | 1/1992 | Brandt et al. |
| 5,195,494 | 3/1993 | Tuckey |
| 5,392,750 | 2/1995 | Laue et al. |

FOREIGN PATENT DOCUMENTS

| | | |
|---|---|---|
| Y2-1-10433 | 3/1989 | Japan |
| U-50-77878 | 3/1990 | Japan |
| A-2-191862 | 7/1990 | Japan |
| U-2-145656 | 12/1990 | Japan |
| U-2-108853 | 11/1991 | Japan |
| U-3-108853 | 11/1991 | Japan |
| A61-8102 | 4/1992 | Japan |

*Primary Examiner*—Carl S. Miller
*Attorney, Agent, or Firm*—Nixon & Vanderhye P.C.

[57] ABSTRACT

A cover for a fuel tank opening is molded with insulating resin and a plurality of terminal pins is directly inserted thereinto. A lower housing portion, made of conductive resin and containing a fuel filter element, is weld-connected to the fuel tank side of the cover. A fuel pump is held under the cover. When electricity is supplied to the fuel pump via an electric connector, fuel is discharged from the fuel pump and this discharged fuel is filtered by a fuel filter. Static electricity generated in the fuel filter dissipates through the lower housing portion made of conductive resin. This construction enables suppression of electrostatic voltage generated in the fuel filter. Moreover, a plurality of connector terminals are directly inserted into the upper housing cover portion of the fuel filter housing at the time of molding, which can therefore supply electric power to the fuel pump with a simplified construction.

34 Claims, 2 Drawing Sheets

000## FUEL SUPPLY SYSTEM

This is a continuation of PCT/JP95/02241, Nov. 2, 1995.

BACKGROUND OF THE INVENTION

1. Field of the Invention

The present invention relates to a fuel supply system which delivers the fuel to a fuel consuming unit such as an internal combustion engine from a fuel tank, and more particularly a fuel supply system mounted on the fuel tank of a vehicle.

2. Related Art

The fuel supply system disclosed in U.S. Pat. No. 5,392,750 has been widely known for delivering fuel to an internal combustion engine. In this structure, however, since a fuel pump and a fuel filter contained inside a fuel tank are united, friction is generated when the fuel passes through a filter element thereby generating an electrostatic voltage within the fuel filter. As a preventive measure against build-up of static electricity in a fuel filter, U.S. Pat. No. 5,076,920 proposes to use conductive resin for the fuel filter housing to discharge the static electricity generated in the fuel filter to the vehicle chassis.

However, when such conductive resin is used for a device integrated with the fuel pump as shown in the U.S. Pat. No. 5,392,750, an electrically-insulated connector is necessary to insulate electric supply terminals contained therein from each other.

SUMMARY OF THE INVENTION

In light of the problem in the above-described conventional technology, the present invention provides an improved fuel supply system.

The present invention supplies electric power to an integrated fuel pump and fuel filter unit in a simplified construction.

According to the present invention, a terminal pin for electric power supply to the fuel pump is insert-molded into a first housing portion made with electrically insulated resin, which ensures the electric power supply to the fuel pump without any separately insulated electric connector. A second housing portion is made of conductive material and is formed to contain the fuel filter element. It is combined with the first housing portion, so that static electricity generated in the fuel filter element can be dissipated to prevent the electrostatic voltage from building up.

It is desirable that the second housing portion is made of conductive resin, and the first housing and the second housing portions are welded together.

Since the first housing portion is integrally molded with a cover for an opening in the fuel tank and opposite edges of a plurality of terminal pins are insert-molded to be exposed inside and outside the fuel tank, power supply of the fuel pump which is held within the fuel tank is ensured.

In case of a fuel level gauge which is held by a holding member, a plurality of terminal pins electrically connected to the fuel level gauge also can be insert-molded into the first housing.

According to a holding unit of the fuel supply system of the present invention, the terminal pins for power supply to the fuel pump are insert-molded into the first housing portion made with electrically insulating resin, which ensures the electric supply to the fuel pump without need for a separately insulated electric connector. Moreover, the second housing portion containing the fuel filter element is made of conductive material and combined with the first housing, so that static electricity generated in the fuel filter element can be dissipated, thereby preventing the electrostatic voltage from building up.

In the holding unit of the fuel supply system of the present invention, since the terminal pins for the power supply to the fuel pump are insert-molded into a cover which is integrally molded with the first housing portion made with an electrically insulating resin, the electric supply to the fuel pump in the fuel tank can be insulated from outside of the fuel tank without installing a separately insulated electric connector. Moreover, the second housing portion connected to the first housing portion for containing the fuel filter element is made of conductive material, so that static electricity generated in the fuel filter element can be dissipated, thereby preventing electrostatic voltage from building up.

A fuel pipe to be connected to fuel consuming units can be drawn from the cover outside the fuel tank.

DETAILED DESCRIPTION OF EXEMPLARY EMBODIMENTS

A preferred embodiment of the present invention is hereinafter described with reference to the accompanying drawings.

Figure 1:
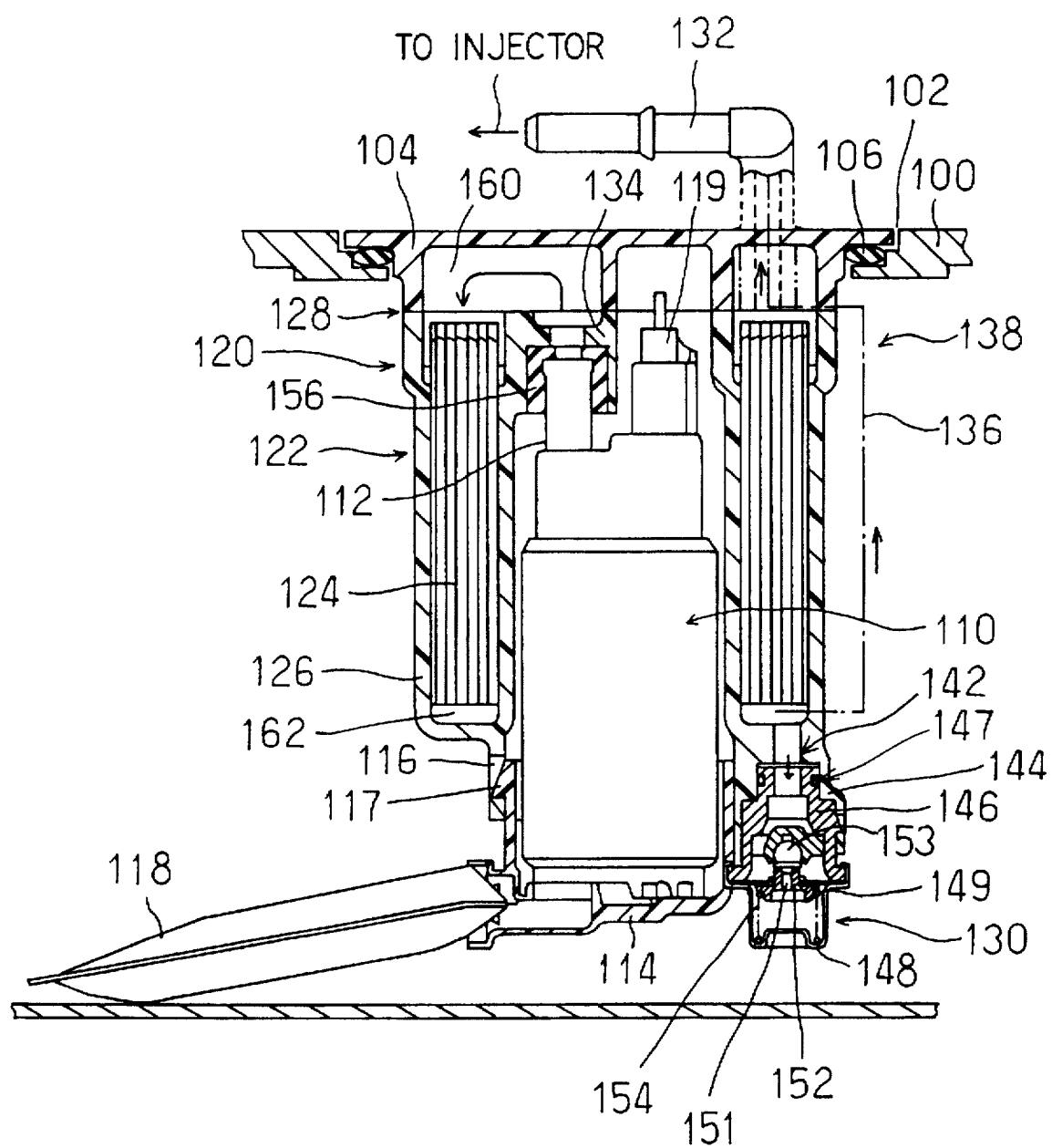
FIG. 1 is a longitudinal cross-sectional view illustrating a first embodiment of the present invention.
Figure 2:
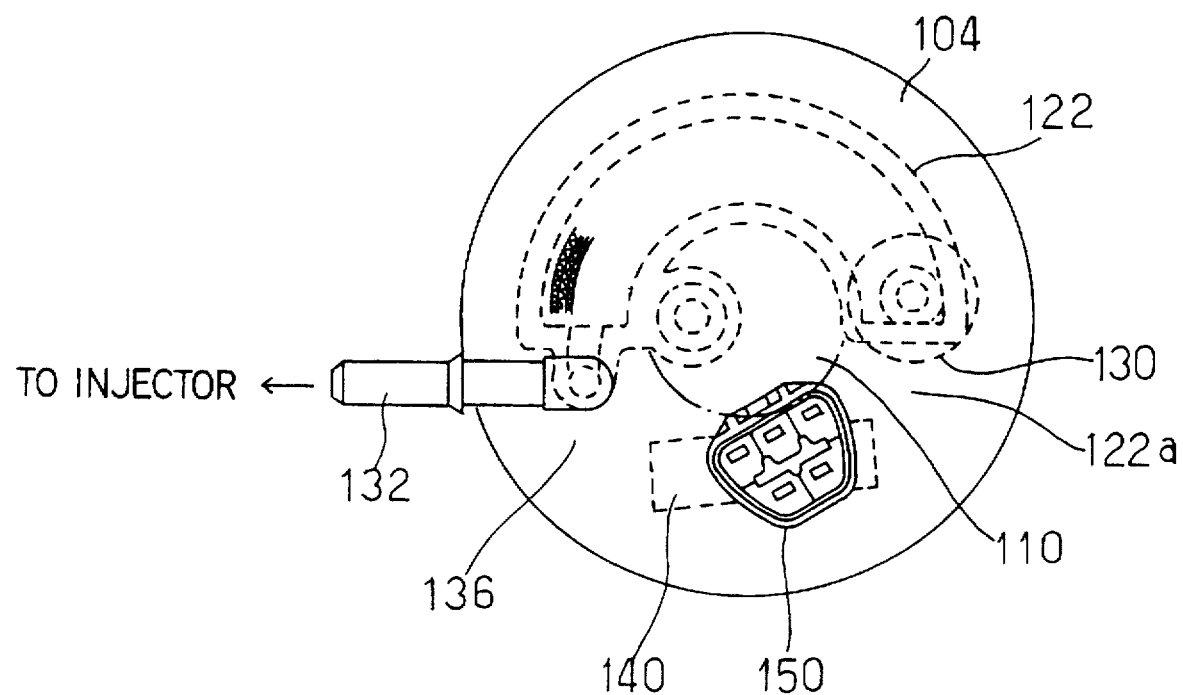
FIG. 2 is a top plan view illustrating the first embodiment.

FIGS. 1 and 2 show the fuel supply system according to a first embodiment.

In the present embodiment, functional parts of the fuel supply system including fuel pump 110, fuel filter 120, pressure regulator 130, fuel level gauge 140, electric connector 150 and fuel pipe 132 are fixed integrally as one unit to cover 104 which closes opening 102 of a fuel tank 100.

The fuel tank 100 is made of metal or resin and has an opening 102. An electrically insulating resin cover 104 is disposed to close opening 102. A sealing gasket 106 is disposed between cover 104 and fuel tank 100.

The fuel filter 120 contains filter element 124 inside housing 122. The cover 104 is formed as a part of the housing 122, from which hangs the fuel filter 120.

The filter element 124 is formed into a hollow annulus from a flat filtering paper and a wavy filtering paper which are adhered to form a unit that is cut along the diameter. The main material of the filtering paper has high affinity to filtered fuel. Glass fibers having especially high affinity to water are mixed in the material. Therefore, water mixed in the fuel can adhere to the glass fibers to become water drops, which can be easily separated from the fuel by flowing toward the bottom of housing 122.

The filter housing 122 is composed of the cover 104 as an upper housing portion and a lower housing portion 126. The lower housing portion 126 is molded with resin including conductive material such as carbon fibers or carbon powder or the like, so that it has electric conductivity. The upper housing portion 104 and the lower housing portion 126 are tightly welded so as to be liquid-tight at the boundary 128.

As shown in FIG. 2, housing 122 is not a complete annulus but an incomplete annulus having a space 122a ranging from substantially 90° or so, thus, it has the cross-sectional shape of a letter C. The upper housing portion 104 made of insulating resin is integrally molded with fuel discharging pipe 132. The lower housing portion 126 containing and fixing element 124 has a cup-like portion in the cross-sectional shape of a letter C.

One fuel inlet and two fuel outlets are disposed on housing 122 of fuel filter 120. A fuel inlet pipe 134 is disposed above the inner peripheral side of housing 122 and connected to fuel discharging pipe 112 of fuel pump 110. A pipe 136 forming a first fuel outlet of two fuel outlets extends upwardly along the axial direction from the lower edge of the lower housing portion 126. The pipe 136 is integrally molded in abutment with the cup-shaped portion of lower housing portion 126 and is located at a notched space 122a of housing 122. The pipe 136 communicating with discharging pipe 132 disposed on cover 104 forms a fuel passage 138 for supplying fuel to an injector after filtration. The other, i.e., second fuel outlet forming a return pipe 142 is disposed in a lower portion of the lower housing portion 126 and connected to pressure regulator 130. It is important for the return pipe 142 to be opened at the lower edge of lower housing portion 126.

The pressure regulator 130 is engaged with and fastened to a cylindrical portion 144 extending downward from the bottom of lower housing portion 126. An O-ring 147 is disposed between a body 146 and the cylindrical portion 144. A resilient snap-fit projection of body 146 is snap-fitted into a hole of cylindrical portion 144 so that pressure regulator 130 can be easily removed from filter housing 122 by removing body 146 from cylindrical portion 144. A diaphragm 149, inserted between the open edge of body 146 and a housing 148, supports a movable valve seat 152 having a discharging passage 151. A fixed valve body 153 co-functioning with valve seat 152 is fixed inside body 146. A compressed coil spring 154 is inserted between housing 148 and diaphragm 149. The housing 148 has a hole (not shown in the figure) to set the spring chamber at atmospheric pressure or a tank interior pressure as well as to release the fuel from the discharging passage 151.

In pressure regulator 130, when fuel pressure inside body 146 exceeds a spring set pressure, diaphragm 149 moves toward the spring chamber to open discharging passage 151 of movable valve seat 152 in order to return fuel inside body 146 to fuel tank 1. Thus, the pressure of fuel discharged by fuel pump 110 and supplied from fuel filter 120 to an injector can be maintained at a predetermined pressure.

According to the present embodiment, the resilient projection of body 146 is fitted to the mated hole of cylindrical portion 144 to fix pressure regulator 130, however, by extending a stay from a pump holder 114 just to insert body 146 into cylindrical portion 144, the housing 148 of pressure regulator 130 can be supported from beneath with the extending stay from pump holder 114.

The fuel pump 110 is contained in an inner peripheral side of filter housing 122 in the shape of a partial annulus in the shape of the letter C, and is also supported from beneath by cup-shaped pump holder 114. A skirt portion extending below the inner periphery of filter housing 122 has a plurality of opened holes 116 which are scattered in the circumferential direction and engaged with resilient projections 117 of the pump holder 114. Thus, the fuel pump 110 can be installed detachably on filter housing 122. The fuel discharging pipe 112 protruding at top of the fuel pump 110 is connected to inlet pipe 134 via a gasket 156. Furthermore, pump holder 114 has a resin-made mesh filter 118. By installing pump holder 114 below fuel pump 110, a suction inlet disposed below fuel pump 110 is so constructed as to communicate with inside of filter 118. As in a conventional fuel pump, a check valve is contained inside discharging pipe 112 to keep residual pressure of fuel inside the fuel pipe at the time the fuel pump 110 is stopped.

The fuel level gauge 140 is located at space 122a of housing 122 of fuel filter 120. A float (not shown) is extended from fuel level gauge 140 to indicate a resistance value corresponding to fuel level.

A plurality of terminal pins of electric connector 150 are integrally molded by insert-molding directly into the insulating cover 104. A sealing agent is applied to the outer periphery of the terminal pins to maintain the sealing performance between the resin material and the terminal pins. A measure to prevent falling off of the terminal pins is also taken. As shown in FIG. 2, electric connector 150 is disposed at a position not to overlap fuel filter 120. The terminal pins of electric connector 150 are connected to a power source and to a control unit outside the fuel tank, and electrically connected to an electric connector 119 of fuel pump 110 through a lead wire (not shown in the figure) to supply electric power to the motor as well as being connected to fuel level gauge 140 through a lead wire (not shown) to transmit an electric signal indicating fuel level inside the fuel tank.

In this way, the filter is disposed in a partial annular range partially on the outer periphery of the fuel pump 110, and the remaining portions have such functional parts as fuel pipe 132, electric connector 150, and fuel level gauge 140.

The flow of fuel is hereinafter explained.

When electric power is supplied to fuel pump 110 through electric connectors 150 and 119, fuel pump 110 sucks fuel via filter 118 and discharges it from discharging pipe 112. The fuel flows inside passage 160 between lower housing portion 126 and upper housing portion 104 as indicated by an arrow. The fuel, flowing inside housing 122 from an upward direction to a downward direction, is filtered by filter element 124 upon passing therethrough.

When fuel reaches the lower space 162 of housing 122 after passing through element 124, a part of the fuel returns to fuel tank 100 by pressure regulator 130 for adjustment of fuel pressure. The remaining fuel is supplied to an injector of a fuel injection unit mounted on the engine after passing through pipes 136 and 132. According to the present embodiment, return fuel circulates only inside fuel tank 100 and fuel does not return from the engine.

Although static electricity is generated due to severe friction between element 124 and fuel passing therethrough, the static electricity is dissipated outside lower housing portion 126 without building-up the electrostatic voltage inside the housing because of the conductive resin molded in lower housing portion 126. At this time, the discharging surface for the static electricity can be increased by an electrically floating metal part disposed in contact with lower housing portion 126 inside the fuel tank, thereby to further suppress the electrostatic voltage to a low level. For example, the discharging surface for static electricity can be expanded when the metal part is in contact with a metallic case of fuel pump 110 which is insulated from both terminals of the power source, reducing static electricity just inside the fuel tank.

If required, the lower housing portion 126 can be connected by a specific electric connecting structure to a grounding electrode inside electric connector 150 to discharge static electricity.

According to the present embodiment, cover 104 can be integrally molded with electric connector 150 by directly inserting terminal pins of the electric connector 150 into cover 104 at the time of its molding. Therefore, a process of fitting a separate electric connector into an opened hole can be omitted. Under (such a situation, the number of parts used such as sealing parts like O-rings disposed between the cover and the electric connector and fixing parts of the electric connector to the cover) can be reduced, which contributes to a reduction in the number of processes and assembling steps. Furthermore, because a reduction in the number of parts, this also reduces the number of resinous materials used for the system and is effective to assist in efficient recycling of the materials. In addition, static electricity, which is generated in the filter element from the lower housing portion 126 forming the filter housing 122 with the cover, can be dissipated to suppress electrostatic voltage.

In the aforementioned embodiment, the fuel filter is disposed only at a portion of the outer periphery of the fuel pump, however, it can be also disposed at portions which surround the outer periphery of the fuel pump.

Moreover, in the above-described embodiment, the fuel pump 110 is held by cover 104 via lower housing portion 126 and fuel filter housing 122 is one component of the holding unit of the fuel pump. However, the holding unit of the fuel pump and the fuel filter housing can be individually constructed. For example, fuel pump holder 114 can be a long cylinder so that it can be directly connected to cover 104.

According to the fuel supply system of the present invention, the terminal pin for electric power supply to the fuel pump is inserted into the first housing molded with electrically insulating resin at the time of molding, which does not require another electric connector but nevertheless ensures electric power supply to the fuel pump. Furthermore, the second housing portion containing the fuel filter element in combination with the first housing portion is made of conductive resin, thereby dissipating static electricity generated in the fuel filter element for the suppression of electrostatic voltage.

What is claimed is:

1. A fuel supply system for supplying fuel to a fuel consuming unit, said fuel supply system comprising:
   holding members holding a fuel pump having a metal case, a fuel filter element and also forming a housing containing said fuel filter element while holding said fuel pump;
   said holding members having a first housing portion and a second housing portion, both connected to each other to form said housing;
   said first housing portion being made of insulating resin;
   said second housing portion being made of conductive resin material and contacting said metal case; and
   a plurality of terminal pins for electric supply to said fuel pump insert-molded into said first housing portion made of said insulating material;
   said first housing portion and said second housing portion being welded together thereby dissipating static electricity from said filter element through said second housing portion to the metal case of said fuel pump.

2. A fuel supply system as in claim 1, wherein said second housing portion comprises a fuel inlet connected to said fuel pump and a fuel outlet connected to said fuel consuming unit.

3. A fuel supply system as in claim 1, wherein
   said first housing portion is integrally molded with a cover closing an opening of a fuel tank; and
   said plurality of terminal pins are insertion-molded into said first housing portion with edges thereof being exposed both inside and outside said fuel tank.

4. A fuel supply system as in claim 3, wherein
   said first housing portion holds a fuel level gauge; and
   a plurality of terminal pins electrically connected to said fuel level gauge are insert-molded into said first housing portion.

5. A fuel supply system as in claim 1, wherein
   said second housing portion is formed in a container shape; and
   said fuel filter element is fixed inside said second housing portion.

6. A holding unit of a fuel supply system holding a fuel pump having a metal case and forming a housing containing a fuel filter element, said holding unit comprising:
   a first housing portion and a second housing portion welded together to form said housing;
   said first housing portion being made of insulating resin;
   said second housing portion being made of conductive resin material and contacting said metal case thereby dissipating static electricity from said filter element through said second housing portion to the metal case of said fuel pump; and
   a plurality of terminal pins for electric supply to said fuel pump insert-molded into said first housing portion made of said insulating material;
   wherein said first housing portion is integrally molded with a cover for an opening of a fuel tank; and
   said plurality of terminal pins are insert-molded into said first thereof are exposed that edges thereof are exposed both inside and outside said fuel tank.

7. A fuel supply system as in claim 6, wherein said second housing portion comprises a fuel inlet connected to said fuel pump and a fuel outlet connected to said fuel consuming unit.

8. A fuel supply system as in claim 6, wherein a plurality of terminal pins electrically connected to a fuel level gauge for detecting a fuel level inside said fuel tank are inserted into said first housing portion at the time of molding.

9. A fuel supply system as in claim 1, further comprising:
   a pressure regulator having a surplus fuel passage which discharges surplus fuel inside said housing.

10. A holding unit of a fuel supply system for holding a fuel pump having a metal case and a fuel filter element installed in a fuel tank, said holding unit comprising:
    a cover for an opening in said fuel tank; and
    a housing containing said fuel filter element;
    wherein said housing comprises:
        a first housing portion integrally molded with said cover and made with insulating resin; and
        a second molded housing portion made with conductive resin and welded to said first housing portion and contacting said metal case thereby dissipating static electricity from said filter element through said second housing portion to the metal case of said fuel pump; and
    wherein said cover comprises a plurality of terminal pins insert-molded therein for electric supply to said fuel pump.

11. A holding unit of a fuel supply system as in claim 10, wherein a fuel pipe connected to a fuel consuming unit extends from said cover toward the outside of said fuel tank.

12. A fuel supply system as in claim 10, comprising:
    a fuel pump containing portion containing said fuel pump;

wherein said filter element is disposed on an outer periphery of said fuel pump containing portion.

13. A holding unit of a fuel supply system for holding a fuel pump and a fuel filter element installed in a fuel tank, said holding unit comprising:
- a cover for an opening in said fuel tank; and
- a housing containing said fuel filter element;
- wherein said housing comprises:
    - a first housing portion integrally molded with said cover and made with insulating resin; and
    - a second molded housing portion made with conductive resin and connected to said first housing portion; and
- wherein said cover comprises a plurality of terminal pins insert-molded therein for electric supply to said fuel pump;
- a fuel pump containing portion containing said fuel pump;
- wherein sad filter element is disposed on an outer periphery of said fuel pump containing portion;
- wherein said housing forms a container for containing said fuel filter element in a C-shape around said outer periphery of said fuel pump containing portion.

14. A holding unit of a fuel supply system as in claim 13, wherein
said housing has a parts-holding portion for holding parts installed in said fuel tank on an open portion of said C-shaped container.

15. A holding unit of a fuel supply system as in claim 13, wherein
said terminal pins are located in said cover at an open portion of said C-shaped container.

16. A fuel supply system including a fuel pump having a metal case, a fuel filter element, a plurality of terminal pins connected to said fuel pump and a housing member, wherein said housing member comprises:
- a first housing portion made of insulating resin holding said terminal pins; and
- a second housing portion made of conductive resin material holding said filter element and dissipating electrostatic voltage generated therein by contact with said metal case thereby dissipating static electricity from said filter element through said second housing portion to the metal case of said fuel pump;
- wherein said first housing portion and said second housing portion are welded together;
- said first housing portion being integrally molded with a cover closing a fuel tank opening; and
- said plurality of terminal pins being insert-molded with edges exposed both inside and outside said fuel tank.

17. A fuel supply system including a fuel pump, a fuel filter element, a plurality of terminal pins connected to said fuel pump and a housing member, wherein said housing member comprises:
- a first housing portion made of insulating resin holding terminal pins; and
- a second housing portion made of conductive material holding said filter element and dissipating electrostatic voltage generated therein;
- wherein said second housing portion comprises a C-shaped container for holding said filter element around said fuel pump.

18. A fuel supply system as in claim 17, wherein
said first housing portion comprises a C-shaped cover member disposed to cover said C-shaped container, and said terminal pins are located at a portion outside said C-shaped cover member.

19. A fuel supply system as in claim 16 wherein said second housing portion also holds said fuel pump.

20. A fuel supply system as in claim 16 wherein said second housing portion comprises a fuel inlet connected to said fuel pump and a fuel outlet connected to said fuel consuming unit.

21. A fuel supply system as in claim 16, wherein
said first housing portion holds a fuel level gauge; and
a plurality of terminal pins electrically connected to said fuel level gauge are insert-molded into said first housing portion.

22. A fuel supply system as in claim 16, wherein
said second housing portion is formed in a shape of a container; and
said fuel filter element is fixed inside said second housing portion.

23. A housing member of a fuel supply system including a fuel pump having a metal case, a fuel filter element and an electric terminal member, said housing member comprising:
- a first housing portion made of insulating resin holding said electric terminal member; and
- a second housing portion made of conductive resin material holding said fuel filter element and contacting said metal case thereby dissipating static electricity from said filter element through said second housing portion to the metal case of said fuel pump;
- wherein said first housing portion and said second housing portion are welded together;
- said first housing portion being integrally molded with a cover for an opening of a fuel tank; and
- said terminal member being insert-molded with edges that are exposed both inside and outside of said fuel tank.

24. A housing member of a fuel supply system including a fuel pump, a fuel filter element and an electric terminal member, said housing member comprising:
- a first housing portion made of insulating resin holding said electric terminal member; and
- a second housing portion made of conductive material holding said fuel filter element,
- wherein said second housing portion comprises a C-shaped container for holding said filter element around said fuel pump.

25. A fuel supply system of a fuel supply system including a fuel pump, a fuel filter element and an electric terminal member, said housing member comprising:
- a first housing portion made of insulating resin holding said electric terminal member; and
- a second housing portion made of conductive material holding said fuel filter element;
- wherein said first housing portion comprises a C-shaped cover member disposed to cover sad C-shaped container, and
- said electric terminal member is located at a portion outside said C-shaped cover member.

26. A housing member as in claim 23 wherein said second housing member also holds said fuel pump.

27. A fuel supply system as in claim 23, wherein said housing comprises a fuel inlet connected to said fuel pump and a fuel outlet connected to said fuel consuming unit.

28. A fuel supply system as in claim 23, further comprising a fuel level gauge disposed in said first housing portion, wherein said terminal member is connected to said fuel level gauge.

29. A fuel supply system as in claim 16, further comprising:

a pressure regulator having a surplus fuel passage extending axially in said housing member.

30. A housing member of a fuel supply system including a fuel pump having a metal case and a fuel filter element and being installed in a fuel tank having a cover, said housing member comprising:

a first housing portion integrally molded with said cover and made with insulating resin;

a second housing portion made of conductive resin holding said fuel filter and contacting said metal case thereby dissipating static electricity from said filter element through said second housing portion to the metal case of said fuel pump; and a plurality of terminal pins connected to said fuel pump and insert-molded into said first housing portion of the cover;

said second housing portion also holding said fuel pump;

a fuel pipe being connected to a fuel consuming unit and extending from said cover toward an outside of said fuel tank; and wherein said filter element is disposed on an outer periphery of said fuel pump containing portion.

31. A housing member of a fuel supply system including a fuel pump and a fuel filter element and being installed in a fuel tank having a cover, said housing member comprising:

a first housing portion integrally molded with said cover and made with insulating resin;

a second housing portion made of conductive resin holding said fuel filter; and a plurality of terminal pins connected to said fuel pump and insert-molded into said cover wherein said filter element is disposed on an outer periphery of said fuel pump containing portion; and wherein said second housing portion further comprises a C-shaped container for holding said filter element around said fuel pump.

32. A housing member of a fuel supply system as in claim 31, wherein said second housing portion further holds parts installed in said fuel tank outside said C-shaped container.

33. A housing member of a fuel supply system as in claim 31, wherein said cover comprises a C-shaped cover portion disposed to cover said C-shaped container; and said terminal pins are located at a portion outside said C-shaped cover portion.

34. A fuel supply unit to be disposed inside a fuel tank, said unit comprising:

a multi-part housing holding a fuel filter and electrically operated components including a fuel pump having a metal casing;

said housing including
(a) a first housing portion made of an electrically insulating material and including insertion-molded electrical conductors extending therethrough; and
(b) a second housing portion made of an electrically conducting material in contact with said metal case and sealed to said first housing portion to form said housing, said fuel filter being contained within a multi-part enclosure formed from both conductive and insulating portions thereby dissipating static electricity from said filter element through said second housing portion to the metal case of said fuel pump.

* * * * *